US006751161B1

(12) United States Patent
Henry, IV et al.

(10) Patent No.: US 6,751,161 B1
(45) Date of Patent: Jun. 15, 2004

(54) FLUIDBORNE SOUND PROJECTOR WITH SWEEP CLEANING FACILITIES

(75) Inventors: John W. Henry, IV, Annapolis, MD (US); David B. Larrabee, Annapolis, MD (US); William F. Flickinger, Arnold, MD (US); Michael J. Grady, Ridley Park, PA (US); Debra M. Kenney, Media, PA (US); Kevin E. Crouchley, Pasadena, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 461 days.

(21) Appl. No.: 09/962,230

(22) Filed: Sep. 26, 2001

Related U.S. Application Data

(63) Continuation-in-part of application No. 09/559,051, filed on Apr. 27, 2000, now Pat. No. 6,320,821.

(51) Int. Cl.[7] .......... H04B 13/02
(52) U.S. Cl. .......... 367/143
(58) Field of Search .......... 367/143

(56) References Cited

U.S. PATENT DOCUMENTS 4,030,063 A 6/1977 Wallen
4,483,411 A 11/1984 Mifsud
5,062,089 A * 10/1991 Willard et al. .......... 181/120
5,467,322 A 11/1995 Walter
5,894,451 A 4/1999 DeJaco et al.
H001966 H * 6/2001 Henry et al. .......... 417/356
6,320,821 B1 * 11/2001 Goldring et al. .......... 367/143

FOREIGN PATENT DOCUMENTS

JP 02002058099 A * 2/2002 .......... H04R/31/00

OTHER PUBLICATIONS

Graesser et al., Understanding Piping Systems and Noise Flanking Paths May 2002, globalsecurity.org, three pages.*

* cited by examiner

*Primary Examiner*—Daniel Pihulic
(74) *Attorney, Agent, or Firm*—Jacob Shuster

(57) ABSTRACT

An acoustic projector device having a piston exposed to pressure balanced air and water in an acoustically ideal position thereof within a piston chamber enclosing sleeve disposed in an outer housing to which deaerating water is selectively supplied in surrounding relation to the piston chamber sleeve while in communication with one side of the piston through axial slots in the sleeve uncovered by displacement of the piston from said acoustically ideal position.

9 Claims, 2 Drawing Sheets

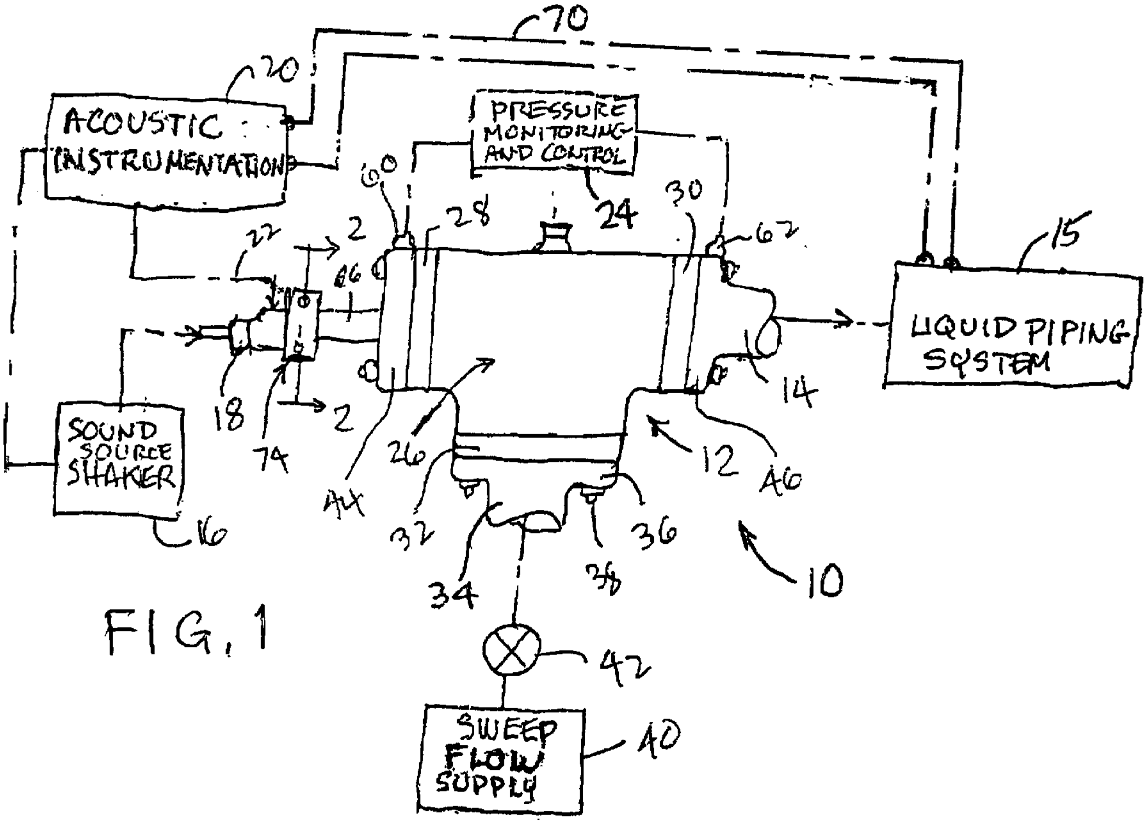
FIG. 1
FIG. 2
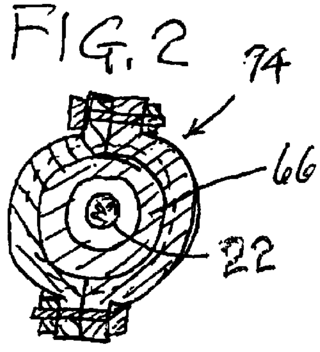

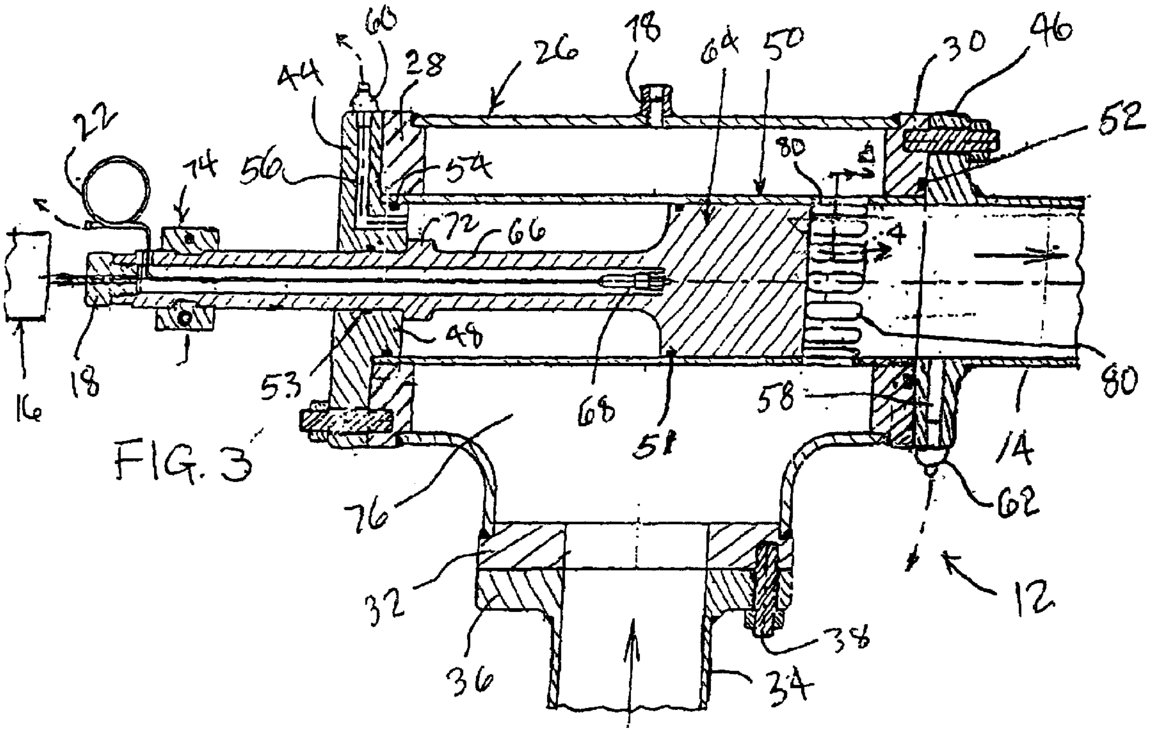
FIG. 3
FIG. 4
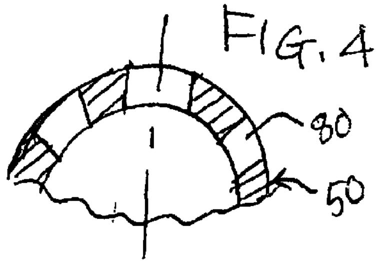

FLUIDBORNE SOUND PROJECTOR WITH SWEEP CLEANING FACILITIES

STATEMENT OF GOVERNMENT INTEREST

The invention described herein may be manufactured and used by or for the Government of the United States of America for governmental purposes without the payment of any royalties thereon or therefor.

The present invention relates generally to translation of acoustical energy into a body of liquid such as water by means of a system as disclosed in a prior application Ser. No. 09/559,051, now U.S. Pat. No. 6,320,821, filed Apr. 27, 2000, with respect to which the present application is a continuation-in-part.

BACKGROUND OF THE INVENTION

The translation of acoustical energy from a high intensity, low frequency fluidborne sound source to a high static pressure piping system is now performed by use of an acoustical projector device involving exposure of a piston to gas and liquid under balanced pressure, as disclosed in the aforementioned prior copending patent application. However, in order to insure signal quality of the sound translated to the piping system, air bubbles must be periodically removed from the fluid through which the sound is being translated. To do so, the aforementioned type of acoustic projector device had to be periodically disassembled from its system for removal of air bubbles and to undergo testing, involving a considerable loss of time and imposition of labor costs. It is therefore an important object of the present invention to provide a modified version of the aforementioned type of acoustic projector device which accommodates selective operation for air bubble removal purposes without disassembly from the associated sound translation system.

SUMMARY OF THE INVENTION

In accordance with the present invention, the aforementioned type of acoustic projector device has a T-shaped housing within which a piston chamber enclosing sleeve is disposed extending axially between a sound source shaker input on a piston rod extending from a piston within the sleeve and a liquid output to the piping system. A sweeping flow of pressurized liquid such as water is selectively supplied through a valve to the housing, intermediate the shaker input and the output end of the sleeve to form a sweep chamber in surrounding relation to such piston chamber enclosing sleeve for discharge of air through a housing vent during a deaerating process. Fluid communication between such sweep chamber and the piston chamber is established during such process when the piston is displaced under system pressure control from its acoustically ideal position within the sleeve for performing the sound translating operation. Toward that end, axially extending slots are formed in the piston chamber enclosing sleeve at a location covered by the piston in its acoustically ideal position in close adjacency to one of two extreme positions between which displacement of the piston is mechanically limited by stops mounted on the piston rod.

BRIEF DESCRIPTION OF THE DRAWING

A more complete appreciation of the invention and many of its attendant advantages will be readily appreciated as the same becomes better understood by reference to the following detailed description when considered in connection with the accompanying drawing wherein:

FIG. 1 is a side elevation view of an acoustic projector device together with other diagrammatically illustrated components of its associated system;

FIG. 2 is a section view taken substantially through a plane indicated by section line 2—2 in FIG. 1;

FIG. 3 is an enlarged side section view of the acoustic projector device illustrated in FIG. 1; and FIG. 4 is a partial section view taken substantially through a plane indicated by section line 4—4 in FIG. 3.

DETAILED DESCRIPTION OF PREFERRED EMBODIMENT

Referring now to the drawing in detail, FIG. 1 illustrates a fluidborne noise generating system 10 featuring an acoustic projector device 12, which is a modified version of the projector device disclosed in the aforementioned prior copending parent application. The projector device 12 supplies fluidborne sound through its tubular output conduit 14 to a liquid piping system 15 for example. Associated with the projector device 12 is an external sound source, such as a shaker 16 connected to an attachment end portion 18 of the device 12 at an axial end thereof opposite the output conduit 14 so as to translate shaker vibration to fluidborne sound in the piping system 15. Acoustic instrumentation 20 as diagrammed in FIG. 1 and described in the aforementioned parent application, is connected through a cable 22 to the device 12 which also has pressure monitoring and control facilities 24 associated therewith similar to those described in the parent application.

Pursuant to the present invention, the device 12 has a T-shaped housing 26 to which parallel spaced end plates 28 and 30 are welded in right angular relationship to an intermediate end plate 32 from which a sweep flow pipe 34 extends. An attachment flange 36 secured by removable screw fasteners 38 to the intermediate housing end plate 32 connects the sweep flow pipe 34 to the housing 26 for conducting de-aerating water thereto from a supply 40 under selective control of an isolation valve 42, for purposes as hereinafter explained. The parallel spaced housing end plates 28 and 30 are also removably attached by screw fasteners to housing end caps 44 and 46, through which the pressure monitoring and control facilities 24 are connected to device 12 as hereinafter indicated.

Referring now to FIG. 3 illustrating the internal details of the acoustic projector device 12, the end cap 44 has an annular hub 48 axially projecting therefrom through the end plate 28 into sealing contact with one axial end portion of a rigid sleeve 50, made of stainless steel for example, which is welded to the housing end plate 28. The other axial end portion of the sleeve 50 is welded to the housing end plate 30 in abutment with its end cap 46 to which the output conduit 14 is attached. The fluid passage between the output conduit 14 and the adjacent end portion of the sleeve 50 within the housing 26 is sealed by an o-ring 52 between the end plate and the end cap 46, while an o-ring 54 seals the other axial end portion of the sleeve 50 on the hub 48 of the end cap 44. Passages 56 and 58 are respectively formed in the housing end caps 44 and 46 for establishing fluid pressure lines to the pressure monitoring and control facilities 24 through taps 60 and 62. Gas and liquid such as air and water are thereby respectively applied through the passages 56 and 58 to a pressure sealed chamber enclosed within the sleeve 50 on opposite axial sides of a piston 64, made of titanium for example to minimize weight. A piston rod 66 extends from the piston 64 in one axial direction through the cap hub 48 out of the housing 26. Piston 64 is sealed against sleeve 50 with o-ring 51, and piston rod 66 is sealed in cap 48 by o-ring 53. The axial end of such piston rod 66, externally of the housing 26, is connected to the attachment end portion 18 of the device 12 through which shaker vibration is imparted thereto. The piston rod 66, which is of tubular cross-section, carries an acceleration sensor 68 therein connected by the signal cable 22 to the acoustic instrumentation 20 which exercises automatic control over operation of the shaker 16 as described in the aforementioned parent application. Additionally, cables 70 as diagrammed in FIG. 1 transmit signals from sensors on the liquid piping system 15 to the acoustic instrumentation 20. Also mounted on the piston rod 66 are axially spaced piston-stroke limiting stops 72 and 74. The stop 72 is located inside of and confined to the piston chamber enclosed by the sleeve 50. Thus, as shown in FIG. 3 the stop 72 abuts the hub 48 of the chamber closing end cap 44 in one extreme position of the piston 64. When the piston 64 is displaced to its other extreme position, the stop 74 fixedly positioned on the piston rod 66 externally of the housing 26 abuts the housing end cap 44 to establish a maximum stroke distance. The stop 74 as shown in FIG. 2, is made of a split-ring construction.

With continued reference to FIG. 3, the housing 26 encloses about the sleeve 50 a sweep chamber 76 to which flow of liquid such as water is directed through the pipe 34, and from which gas such as air is discharged through a vent 78. Fluid communication is established between the sweep chamber 76 and the piston chamber within the sleeve 50 on one axial side of the piston 64 through slots 80 as shown in FIGS. 3 and 4. Such fluid communication is interrupted in response to closure of the slots 80 by the piston 64 when displaced in one axial direction (rightward) from the axial extreme position thereof as shown in FIG. 3.

Thus, based on the foregoing disclosure the acoustic projector device 12 may be utilized for selectively controlled removal of air bubbles from the piping system 15 by opening of the isolation valve 42 to supply water under pressure through the sweep pipe 34 to the sweep chamber 76 within the housing 26 for filling thereof with the water forcing discharge of all air therein through the vent 78. During such deaerating sweep flow process, initiated by inflow of the water from supply 40, the slots 80 are fully or partially open for fluid communication between the deaerating sweep chamber 76 and the conduit 14 to the piping system 15 for clean sweep of air bubbles while the piston 64 is positioned at its extreme axial location as shown in FIG. 3, or closely spaced therefrom so as to uncover the slots 80 for sweep cleaning purposes. The piston 64 is otherwise positioned in an ideal acoustic transfer location closing the slots 80 so as to seal the piston chamber under control of the facilities 24 through which balanced gas and liquid forces are exerted on opposite sides of the piston 64 within the piston chamber enclosing sleeve 50 for performing the sound translating operation.

In view of the foregoing described arrangement associated with the acoustic projector device 12 pursuant to the present invention, it will be apparent that selectively instituted sweeping operation for removal of air bubbles is accommodated without removal of the device 12 from the system 10, so as to save time and labor costs when performing acoustic testing and to ensure acoustic data quality.

Obviously, other modifications and variations of the present invention may be possible in light of the foregoing teachings. It is therefore to be understood that within the scope of the appended claims the invention may be practiced otherwise than as specifically described.

What is claimed is:

1. In combination with an acoustic projector device associated with a system through which acoustical energy is translated into a body of liquid, said device having a piston exposed to said liquid and gas within a piston chamber in a housing; sweep means operatively connected to the housing for selectively removing bubbles of the gas from the liquid to which the piston is exposed without disassembly of the device from the system.

2. The combination as defined in claim 1, wherein said device further includes a piston rod extending from the piston; stop means mounted on the piston rod for mechanically limiting displacement of the piston between extreme positions; and operational control means for rendering the sweep means inoperative in one of said extreme positions of the piston.

3. The combination as defined in claim 2, wherein said piston chamber means is enclosed within a sleeve fixed to the housing; said operational control means comprising axially extending slots formed in the sleeve covered by the piston in said one of the extreme positions thereof.

4. The combination as defined in claim 3, wherein said sweep means comprises: a source of the liquid under pressure; selectively operable valve means connecting said source to the housing for supply of the liquid under pressure to a sweep chamber in surrounding relation to the sleeve; and vent means for discharge of the gas from the sweep chamber under pressure of the liquid therein; said sweep chamber being in fluid communication with the piston chamber through the slots formed in the sleeve when uncovered by the piston displaced from said one of the extreme positions.

5. The combination as defined in claim 1, wherein said piston chamber is enclosed within a sleeve fixed to the housing; and operational control means for rendering the sweep means inoperative in an acoustically ideal position of the piston within said sleeve.

6. The combination as defined in claim 5, wherein said operational control means comprises: axially extending slots formed in the sleeve covered by the piston in said acoustically ideal position thereof.

7. The combination as defined in claim 6, wherein said sweep means comprises: a source of the liquid under pressure; selectively operable valve means connecting said source to the housing for supply of the liquid under pressure to a sweep chamber in surrounding relation to the sleeve; and vent means for discharge of the gas from the sweep chamber under pressure of the liquid therein; said sweep chamber being in fluid communication with the piston chamber through the slots formed in the sleeve when uncovered by the piston displaced from said acoustically ideal position thereof.

8. The combination as defined in claim 1, wherein said sweep means comprises: a source of the liquid under pressure; selectively operable valve means connecting said source to the housing for supply of the liquid under pressure to the housing in surrounding relation to the piston chamber; vent means mounted in the housing for discharge of the gas under pressure of the liquid from said source; and operational control means for establishing fluid communication of the liquid supplied to the housing with the piston chamber in response to displacement of the piston therein from an acoustically ideal position.

9. The combination as defined in claim 8, wherein said piston chamber is enclosed within a sleeve fixed to the housing; and said operational control means comprises axially extending slots formed in the sleeve and covered by the piston in said acoustically ideal position thereof.

* * * * *